US011192339B2

(12) United States Patent
Kim

(10) Patent No.: US 11,192,339 B2
(45) Date of Patent: Dec. 7, 2021

(54) TOUCH SCREEN DISPLAY AND ELECTRONIC DEVICE INCLUDING SAME

(71) Applicant: Samsung Electronics Co., Ltd., Gyeonggi-do (KR)

(72) Inventor: Min Uk Kim, Gyeonggi-do (KR)

(73) Assignee: Samsung Electronics Co., Ltd ( * ) Notice: Subject to any disclaimer, the term of this patent is extended or adjusted under 35 U.S.C. 154(b) by 0 days.

(21) Appl. No.: 16/340,315

(22) PCT Filed: Sep. 29, 2017

(86) PCT No.: PCT/KR2017/010984
§ 371 (c)(1),
(2) Date: Apr. 8, 2019

(87) PCT Pub. No.: WO2018/066936
PCT Pub. Date: Apr. 12, 2018

(65) Prior Publication Data
US 2019/0255811 A1 Aug. 22, 2019

(30) Foreign Application Priority Data
Oct. 7, 2016 (KR) .................. 10-2016-0129855

(51) Int. Cl.
B32B 17/06 (2006.01)
B32B 7/02 (2019.01)
(Continued)

(52) U.S. Cl.
CPC ................ B32B 17/06 (2013.01); B32B 7/02 (2013.01); B32B 7/12 (2013.01); B32B 7/14 (2013.01)

(58) Field of Classification Search
CPC .. B32B 17/06; B32B 7/02; B32B 7/12; B32B 7/14; G06F 3/041–047
See application file for complete search history.

(56) References Cited

U.S. PATENT DOCUMENTS 8,258,017 B2 * 9/2012 Masuko ............. C08G 65/3322
438/118
9,092,104 B2 7/2015 Kang
(Continued)

FOREIGN PATENT DOCUMENTS

EP 2 648 079 10/2013
EP 2765450 8/2014
(Continued)

OTHER PUBLICATIONS

European Search Report dated Jul. 29, 2019 issued in counterpart application No. 17858730.9-1231, 8 pages.
(Continued)

Primary Examiner — Stephen G Sherman
(74) Attorney, Agent, or Firm — The Farrell Law Firm, P.C.

(57) ABSTRACT

One embodiment of the disclosure discloses a touch screen display including a first polarizing plate, a second polarizing plate disposed under the first polarizing plate, a touch panel disposed between the first polarizing plate and the second polarizing plate, a display panel disposed under the second polarizing plate, and a photosensitive adhesive member disposed at least between the first polarizing plate and the touch panel or between the second polarizing plate and the display panel. Further, one embodiment of the disclosure discloses an electronic device including the touch screen display. In addition, various embodiments are possible which are understood through the specification.

15 Claims, 13 Drawing Sheets

(51) Int. Cl.
  *B32B 7/14* (2006.01)
  *B32B 7/12* (2006.01)

(56) References Cited

U.S. PATENT DOCUMENTS

| | | | |
|---|---|---|---|
| 9,495,033 B2 | 11/2016 | Yano et al. | |
| 2004/0095336 A1* | 5/2004 | Hong | G06F 3/045 |
| | | | 345/173 |
| 2004/0104900 A1* | 6/2004 | Bang | G06F 3/0412 |
| | | | 345/173 |
| 2008/0048558 A1* | 2/2008 | Song | H01L 51/5281 |
| | | | 313/504 |
| 2012/0044635 A1* | 2/2012 | Rothkopf | H04M 1/026 |
| | | | 361/679.54 |
| 2013/0040123 A1 | 2/2013 | Cho et al. | |
| 2013/0057508 A1* | 3/2013 | Shih | G06F 3/044 |
| | | | 345/174 |
| 2013/0258570 A1 | 10/2013 | Nashiki et al. | |
| 2014/0036170 A1 | 2/2014 | Nashiki et al. | |
| 2014/0218630 A1 | 8/2014 | Kang | |
| 2014/0225871 A1 | 8/2014 | Kim et al. | |
| 2015/0138452 A1 | 5/2015 | Petcavich | |
| 2015/0301667 A1 | 10/2015 | Yano et al. | |
| 2016/0041679 A1 | 2/2016 | Ahn et al. | |
| 2016/0054832 A1 | 2/2016 | Kim et al. | |
| 2016/0200086 A1 | 7/2016 | Dolezal et al. | |
| 2016/0239131 A1* | 8/2016 | Kang | G06F 3/044 |
| 2016/0378231 A1 | 12/2016 | Kim et al. | |
| 2017/0115780 A1 | 4/2017 | Ogikubo | |
| 2018/0366665 A1 | 12/2018 | Ahn et al. | |

FOREIGN PATENT DOCUMENTS

| | | |
|---|---|---|
| KR | 1020140086123 | 7/2014 |
| KR | 1020140100090 | 8/2014 |
| KR | 1020140101200 | 8/2014 |
| KR | 101502532 | 3/2015 |
| KR | 1020150036476 | 4/2015 |
| KR | 1020160024425 | 3/2016 |
| KR | 1020160087877 | 7/2016 |
| KR | 1020170000187 | 1/2017 |
| WO | WO 2016/009784 | 1/2016 |

OTHER PUBLICATIONS

PCT/ISA/210 Search Report issued on PCT/KR2017/010984, pp. 5.
PCT/ISA/237 Written Opinion issued on PCT/KR2017/010984, pp. 7.

* cited by examiner ated with an electronic device according to an embodiment.
TOUCH SCREEN DISPLAY AND ELECTRONIC DEVICE INCLUDING SAME

PRIORITY

This application is a National Phase Entry of PCT International Application No. PCT/KR2017/010984 which was filed on Sep. 29, 2017, and claims priority to Korean Patent Application No. 10-2016-0129855, which was filed on Oct. 7, 2016, the content of each of which is incorporated herein by reference.

TECHNICAL FIELD

Embodiments disclosed herein relate to a stacked structure of a touch screen display.

BACKGROUND ART

Recently, as an electronic device equipped with a proprietary operating system is spread rapidly, an electronic device supports various functions such as internet service, digital broadcast viewing, a mobile game, or the like in addition to a call function. As such, the electronic device evolved into a multifunctional medium is becoming a daily necessity for modern people who are living in a ubiquitous society. Accordingly, the electronic device is being developed in a way to minimize limitations of the operating environment. Miniaturizing, weight-saving, or improving portability of the electric device are on the rise of a major issue of the development.

DISCLOSURE

Technical Problem

Miniaturization, weight-saving, or portability improvement of an electronic device may require resolution of spatial constraints in the electronic device based on hardware or software improvements of components.

The disclosure provides a touch screen display that may reduce a thickness of a stacked structure based on a photosensitive adhesive on a display structure and an electronic device including the touch screen display.

Technical Solution

An electronic device according to one embodiment may include a housing having at least one open region, and a touch screen display disposed in an internal space of the housing, wherein at least a portion of the touch screen display is exposed through the open region of the housing. Further, the touch screen display may include a first polarizing plate, a second polarizing plate disposed under the first polarizing plate, a touch panel disposed between the first polarizing plate and the second polarizing plate, a display panel disposed under the second polarizing plate, and a photosensitive adhesive member disposed at least between the first polarizing plate and the touch panel or between the second polarizing plate and the display panel.

Advantageous Effects

According to various embodiments, a structural improvement of the touch screen display may realize miniaturization, weight-saving, or flexibility of the electronic device.

According to various embodiments, the stacking process between the electronic device components may be simplified.

In addition to this, various effects may be provided that are directly or indirectly grasped through the disclosure.

MODE FOR INVENTION

Figure 1:
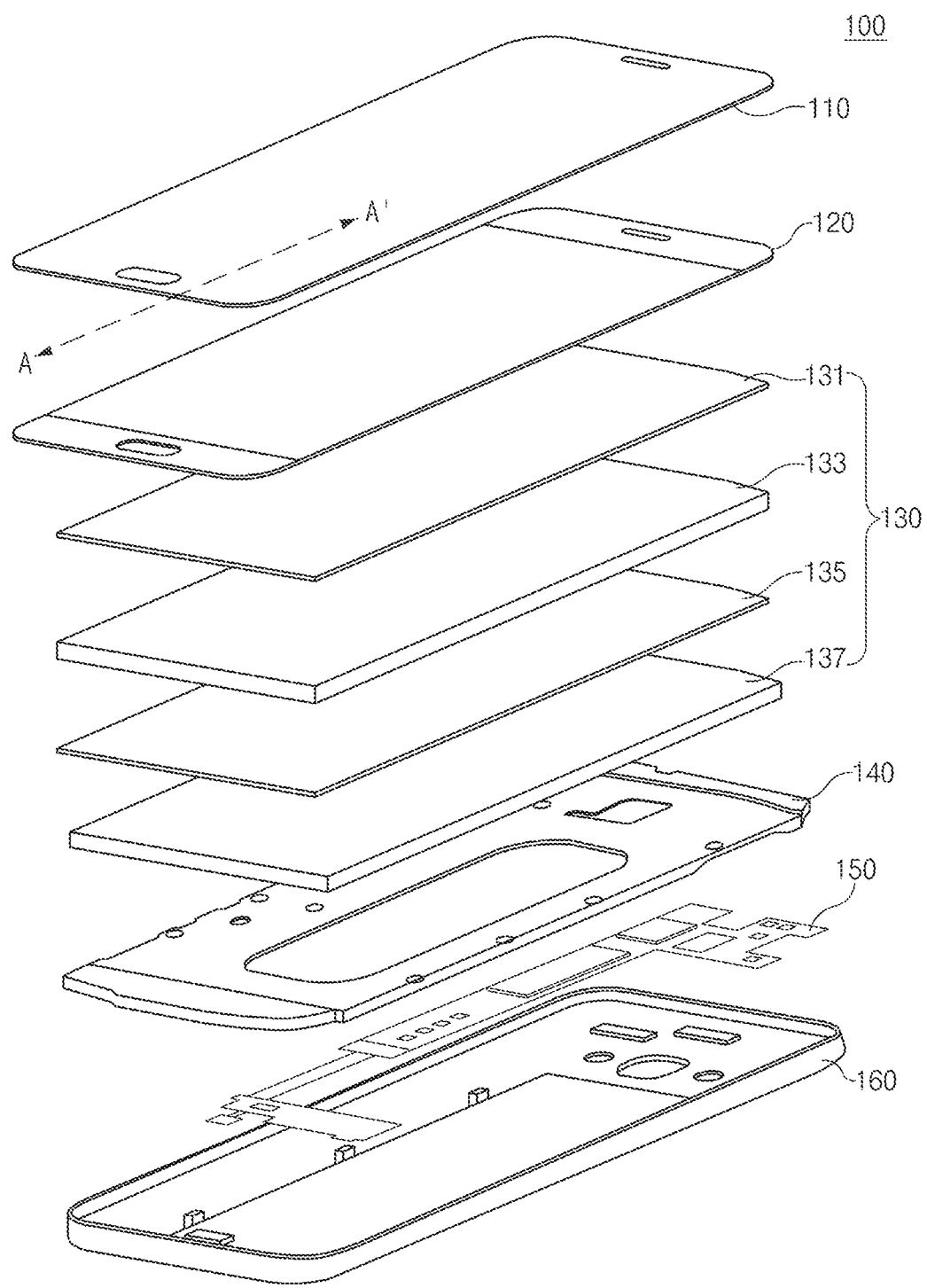
FIG. 1 is an exploded perspective view of an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like).

According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is an exploded perspective view of an electronic device according to an embodiment.

With reference to FIG. 1, an electronic device 100 may include a cover glass 110, a printed member 120, a touch screen display 130, a support member 140, a printed circuit board 150, and a housing 160. In various embodiments, at least some of the components of the electronic device 100 described above may have a predetermined amount of flexibility.

In one embodiment, the electronic device 100 may additionally include components other than those described above. For example, the electronic device 100 may include at least one photosensitive adhesive member with respect to structural bonding between the components. The above photosensitive adhesive member may change internal chemical structure thereof in response to light to be irradiated, in this case the photosensitive adhesive member may become adhesive. Accordingly, a separate adhesive application may be omitted on one or both surfaces of the photosensitive adhesive member, thereby reducing a stack thickness resulting from a bonding of the components. Thus, this may contribute to a miniaturization, weight-saving, or flexibility implementation of the electronic device 100. This will be described below.

The housing 160 may form an outer surface of the electronic device 100, and may receive at least some of the components described above. In this regard, the housing 160 may include a bottom surface and at least one side surface extending at a specific angle (e.g., perpendicular) from an edge of the bottom surface. According to various embodiments, a top region of the at least one side surface may be curved inwardly at a predetermined angle. At least some regions of the housing 160 (e.g., at least some regions of a top surface opposite to the bottom surface, or a region of the top surface region opposite to the bottom surface, other than a region corresponding to the inwardly curved region of the side surface) may be open. Based on the structure described above, the housing 160 may include an internal space open in one direction (e.g., upward direction). Other components of the electronic device 100 (e.g., the touch screen display 130, the support member 140, the printed circuit board 150, or the like) may be mounted in the internal space.

The cover glass 110 may be received in the internal space of the housing 160 such that at least some regions of the cover glass 110 are exposed to the open region of the housing 160. At least some of regions of the cover glass 110 that are inserted into the internal space may engage or adhere to an inner surface of the housing 160 to finish the open housing 160. As such, the cover glass 110 shields the internal space of the housing 160, thereby blocking entry of foreign matter into the internal space and protecting the components in the internal space from external hazards. In one embodiment, a user input associated with a management or function control of the electronic device 100 may be applied on the cover glass 110. The user input may include at least one of a touch, drag, sweep, press, gesture, proximity, or hovering of a user's body part (e.g., finger) or a touch pen. In various embodiments, the cover glass 110 may be included as a component of the touch screen display 130 described below.

The cover glass 110 may transmit light generated by the touch screen display 130. In this regard, a transparent material such as alumina silicate, soda lime, sapphire, or the like may be reinforced to form the cover glass 110. The cover glass 110 is only a name for the component, and a material thereof is not limited to a glass. For example, the cover glass 110 may include a soft film material in connection with the flexibility implementation of the electronic device 100. The film material may include, for example, at least one polymeric compound of a polyimide, polymethyl methacrylate, triacetyl cellulose, polyethylene terephthalate, polyethylene naphthalate, cyclo olefin polymer, or cyclic olefin copolymer.

The printed member 120 may be adhered to a bottom surface of the cover glass 110 to divide the region of the cover glass 110 into a view region and a blind region. The view region may be a region where a screen output by the touch screen display 130 is visible. In addition, the blind region may refer to a region that shields the cover glass 110 such that the inside of the electronic device 100 is not visible from the outside. In this regard, the printed member 120 may include a transparent region of a predetermined area from a center of the printed member 120 and an opaque region corresponding to an edge of the transparent region. As the printed member 120 is disposed on the bottom surface of the cover glass 110, each of the transparent region and opaque region of the printed member 120 may implement the view region and the blind region of the cover glass 110. In various embodiments, the printed member 120 may include a film, a sheet, and the like applied with an opaque material (e.g., ink, etc.) in at least some regions (e.g., opaque region) thereof. In various embodiments, the printed member 120 may be integrated with the cover glass 110 described above, and included as a component of the touch screen display 130.

The touch screen display 130 may output related content (e.g., a text, image, video, icon, widget, symbol, etc.) corresponding to the user input applied on the cover glass 110. In one embodiment, the touch screen display 130 may include at least one polarizing plate 131 and/or 135, a touch panel 133, and a display panel 137 in connection with performing a function.

The at least one polarizing plate 131 and/or 135 may selectively transmit only light that oscillates at a predetermined phase axis among light incident on the cover glass 110. Alternatively, the at least one polarizing plate 131 and/or 135 may delay a phase of the light incident on the cover glass 110. In one embodiment, the at least one polarizing plate 131 and/or 135 may include a film material or a liquid crystal material. The liquid crystal material may be realized by applying and depositing liquid crystal on a predetermined substrate. In various embodiments, the at least one polarizing plate 131 and/or 135 may include a protection film on one or both surfaces thereof. The protection film may lower a light reflectance of the polarizing plates 131 and 135, or suppress light scattering and surface reflection. In various embodiments, the protection film may include at least one of a hard coating film, an anti-glare (AG) film, a low-reflective (LR) film, or an anti-reflective (AR) film. Alternatively, the protection film may include an AG/LR film or an AG/AR film in which some of the above-described films are combined.

The touch panel 133 may detect a signal for the user input applied on the cover glass 110, and output the detected signal as an electrical signal. In this regard, the touch panel 133 may include at least one electrode layer and a control circuit. The control circuit may sense a change in physical quantity (e.g., a voltage) due to a physical contact between the electrode layers, or a change in physical quantity (e.g., a capacitance) of the electrode layer due to charge induction. The control circuit may determine a position (or coordinate) to which the user input is applied based on the detected physical quantity change. In addition, the control circuit may calculate the number, a frequency, occurrence time, duration, and the like of the user input operation based on the physical quantity change. In various embodiments, a performance of the control circuit described above may be performed by other components (e.g., processor) of the electronic device 100.

The display panel 137 may output content corresponding to the user input or predetermined scheduling information. For example, the display panel 137 may output content or a graphical user interface related to at least one application program stored in the electronic device 100. The display panel 137 may also output content or a graphical user interface related to a lock screen or a home screen of the electronic device 100. In various embodiments, the display panel 137 may include the touch panel 133 described above as a component. In various embodiments, the display panel 137 may include at least one of a liquid crystal display (LCD), a light-emitting diode (LED) display, an organic light-emitting diode (OLED) display, a microelectromechanical system (MEMS) display, or an electronic paper display.

The support member 140 (e.g., a bracket) may be disposed under the touch screen display 130 to support or fix the touch screen display 130. In various embodiments, the support member 140 may include a separate fastening member (e.g., screw or band, etc.) for coupling with the touch screen display 130. Alternatively, an adhesive material may be applied to at least some regions of a top surface of the support member 140. In addition, the support member 140 may be involved with the touch screen display 130 based on the adhesive material.

Various electronic components (e.g., a processor, a memory, a communication module, or the like) associated with the management of the electronic device 100 may be mounted on the printed circuit board 150. Further, at least one electronic device (e.g., a speaker, a camera, or the like) or a circuit wire related to the electronic device may be mounted on the printed circuit board 150. In various embodiments, the printed circuit board 150 may include a plurality of printed circuit board. In addition, at least some of the plurality of printed circuit board 150 may be stacked and electrically connected to each other.

Figure 2A:
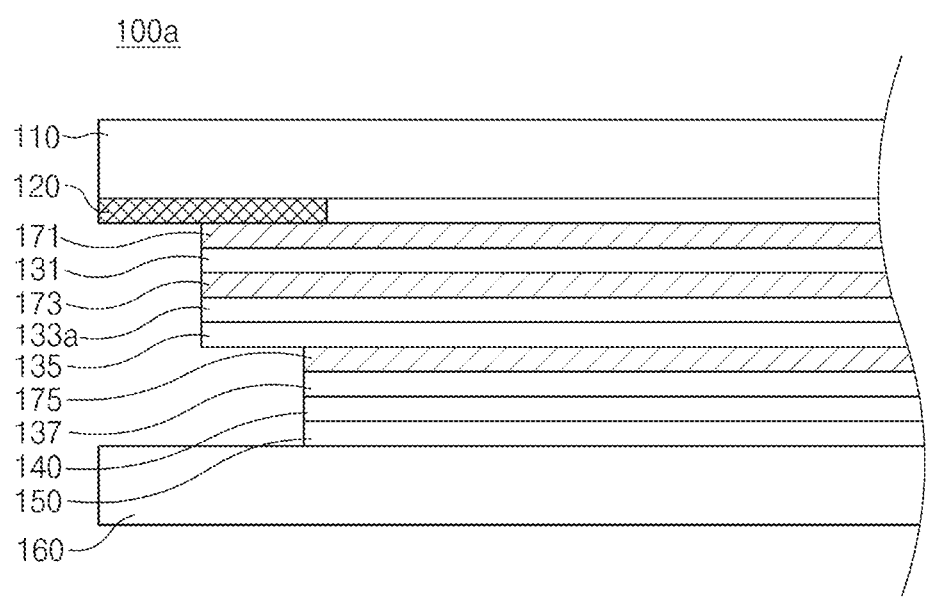
FIG. 2A is a diagram illustrating a stacked structure between at least some components of an electronic device according to an embodiment.
Figure 2B:
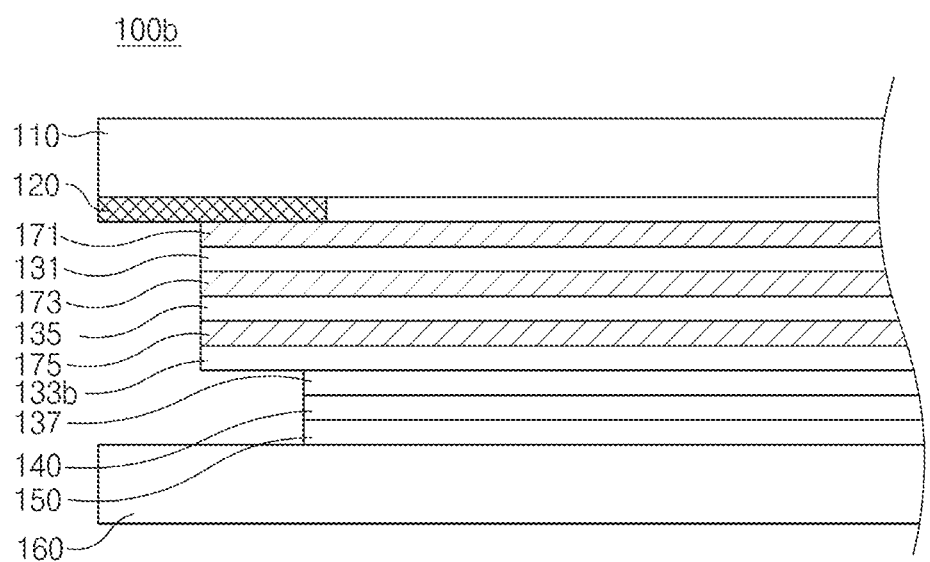
FIG. 2B is a diagram illustrating a stacked structure between at least some components of an electronic device according to another embodiment.

FIGS. 2A and 2B are diagrams illustrating stacked structures between at least some components of an electronic device according to various embodiments. The electronic device illustrated in FIGS. 2A and 2B may be understood as a cross section in a direction of A-A' in FIG. 1.

With reference to FIG. 2A, at least some of components of an electronic device 100a according to a first embodiment may be stacked in a predetermined order in a first direction (e.g., upper direction side of the support member 140) on the support member 140. For example, the display panel 137, the second polarizing plate 135, a touch panel 133a, the first polarizing plate 131, the cover glass 110 to which the printed member 120 is adhered, and the like may be stacked in order on the top surface of the support member 140.

With respect to the stacked structure between the components, the photosensitive adhesive member as described above such as photosensitive adhesive members 171, 173, and 175 may be disposed in at least some of spaces between the components. For example, the third photosensitive adhesive member 175, the second photosensitive adhesive member 173, and the first photosensitive adhesive member 171 may be respectively disposed between the display panel 137 and the second polarizing plate 135, between the touch panel 133a and the first polarizing plate 131, and between the first polarizing plate 131 and the printed member 120. Alternatively, in various embodiments, the disposition of the second photosensitive adhesive member 173 may be excluded. For example, the third photosensitive adhesive member 175 and the first photosensitive adhesive member 171 may be respectively disposed between the display panel 137 and the second polarizing plate 135 and between the first polarizing plate 131 and the printed member 120. Further, the touch panel 133a and the first polarizing plate 131 may be adhered based on a separate adhesive (e.g., optically clear adhesive (OCA)).

When light (e.g., ultraviolet light) is irradiated onto at least some regions of the photosensitive adhesive members 171, 173, and 175, internal chemical structures of the photosensitive adhesive members 171, 173, and 175 may be changed and the photosensitive adhesive members 171, 173, and 175 may become adhesive. In various embodiments, in order to achieve the chemical structures, each of the photosensitive adhesive members 171, 173, and 175 may include at least one of a binder polymer and/or a photopolymerizable compound or a photopolymerization initiator containing an ethylene-based unsaturated bond.

In one embodiment, the photosensitive adhesive members 171, 173, and 175 may have a thickness in a range of 2.5 to 75.0 micrometers (μm). Accordingly, when the components of the electronic device are stacked using the photosensitive adhesive members 171, 173, and 175, a relatively thin stacked structure may be achieved in the OCA of 5.0 micrometers commonly used as the adhesive. In various embodiments, the second photosensitive adhesive member 173 may function as an insulating coverlay that shields the at least one electrode layer included in the touch panel 133a in whole or in part and protects the same.

In various embodiments, the display panel 137 may include a Liquid Crystal Display (LCD). In this case, the first polarizing plate 131 and the second polarizing plate 135 may include, for example, a linear-polarizing plate for oscillating unpolarized light in a specific axial direction. For example, the first polarizing plate 131 may be a first linear-polarizing plate that transmits incident light in a first axis (e.g., horizontal or X axis) direction. Further, the second polarizing plate 135 may be a second linear polarizing plate that transmits, in a second axis (e.g., vertical or Y axis) direction, the light that is phase-retarded due to the liquid crystal after transmitting the first polarizing plate 131.

In various embodiments, the display panel 137 may include one of a light-emitting diode (LED) display or an organic light-emitting diode (OLED) display. In this regard, the first polarizing plate 131 and the second polarizing plate 135 may be provided, for example, to ensure a clear representation of a black screen output by the display panel 137, or to ensure outdoor visibility. When the display panel 137 includes the LED display or the OLED display, the first polarizing plate 131 may be configured as the first linear-polarizing plate for the first axis (e.g., horizontal or X-axis) direction and the second polarizing plate 135 may be configured as a first phase-retardation polarizing plate for changing a phase of linearly-polarized light. In various embodiments, the first phase-retardation polarizing plate may include at least one of a λ/4 or λ/2 phase-retardation polarizing plate.

Subsequently, with reference to FIG. 2B, an electronic device 100b according to a second embodiment has a stacked structure that is at least partially similar to the electronic device 100a according to the first embodiment described above, but may have a difference with respect to a disposition of a touch panel 133b. In FIG. 2B, components that are the same or correspond to the components described in FIG. 2A are given the same reference numerals, and redundant descriptions may be omitted.

On the stacked structure of the electronic device 100b according to the second embodiment, the touch panel 133b may be stacked on a top surface of the display panel 137. In this regard, at least some of electrode layers included in the touch panel 133b may be included in the display panel 137. For example, a first electrode layer (e.g., Rx electrode layer) of the touch panel 133b may be mounted on an upper substrate constituting the display panel 137 or formed on the upper substrate (e.g., on-cell mode). Alternatively, the first electrode layer (e.g., Rx electrode layer) and a second electrode layer (e.g., Tx electrode layer) of the touch panel 133b may be formed within the display panel 137 (e.g., in-cell mode). In a case of the in-cell mode, a substrate forming the electrode layer of the touch panel 133b may be excluded, which may contribute to miniaturizing or weight-saving of the electronic device 100b.

Figure 3A:
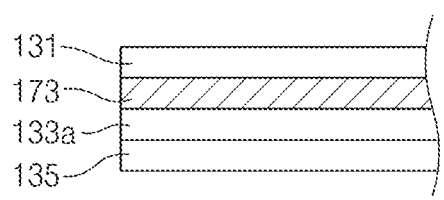
FIG. 3A is a diagram illustrating a first stacking process between at least some components of an electronic device according to an embodiment.
Figure 3B:
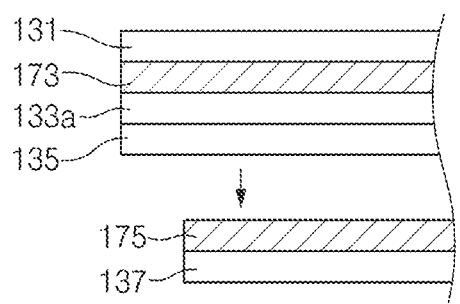
FIG. 3B is a diagram illustrating a second stacking process between at least some components of an electronic device according to an embodiment.
Figure 3C:
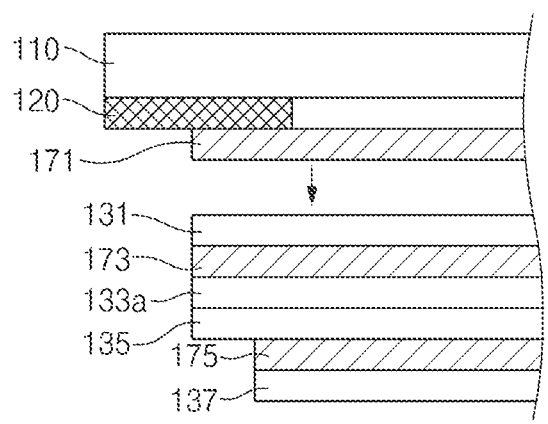
FIG. 3C is a diagram illustrating a third stacking process between at least some components of an electronic device according to an embodiment.

FIGS. 3A to 3C are diagrams illustrating stacking processes between at least some components of an electronic device according to an embodiment.

According to various embodiments, at least some components of the above-described electronic device (e.g., 100a in FIG. 2A) may be stacked via a predetermined process. In this regard, with reference to FIG. 3A, the process may include a first process for implementing the touch panel 133a on the second polarizing plate 135 and stacking the first polarizing plate 131 on a top surface of the touch panel 133a using the second adhesive member 173. In one embodiment, the first process may include a process of irradiating light (e.g., ultraviolet light) to at least a portion of the second adhesive member 173. Further, the first process may include a process of curing the second adhesive member 173 having the adhesive property developed due to the light irradiation for a predetermined time period.

Subsequently, with reference to FIG. 3B, the process may include a second process for adhering the display panel 137 to a stacked structure resulting from the first process described above. In one embodiment, the second process may include a process of disposing the third adhesive member 175 between the stacked structure resulting from the first process and the display panel 137. Further, the second process may include a process of irradiating light (e.g., ultraviolet light) to at least a portion of the third adhesive member 175, and then curing the third adhesive member 175 for a predetermined time period.

The touch screen display (130 in FIG. 1) structured via the first and second processes may be adhered to the cover glass 110 via a third process using the first adhesive member 171, as shown in FIG. 3C. In one embodiment, the third process may include a process of disposing the first adhesive member 171 between the cover glass 110 to which the printed member 120 is attached via a separate process and the stacked structure resulting from the second process, and integrating upper and lower structures via a light irradiation and curing process for the first adhesive member 171.

Figure 4:
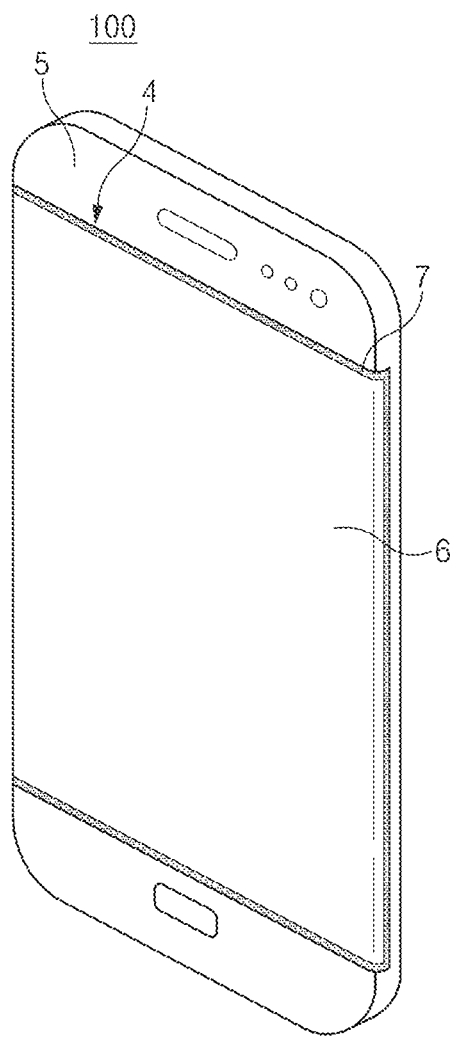
FIG. 4 illustrates a front surface of an electronic device according to an embodiment.

FIG. 4 illustrates a front surface of an electronic device according to an embodiment. In addition, FIG. 5 illustrates an arrangement structure of electrode trace patterns according to an embodiment.

Figure 5:
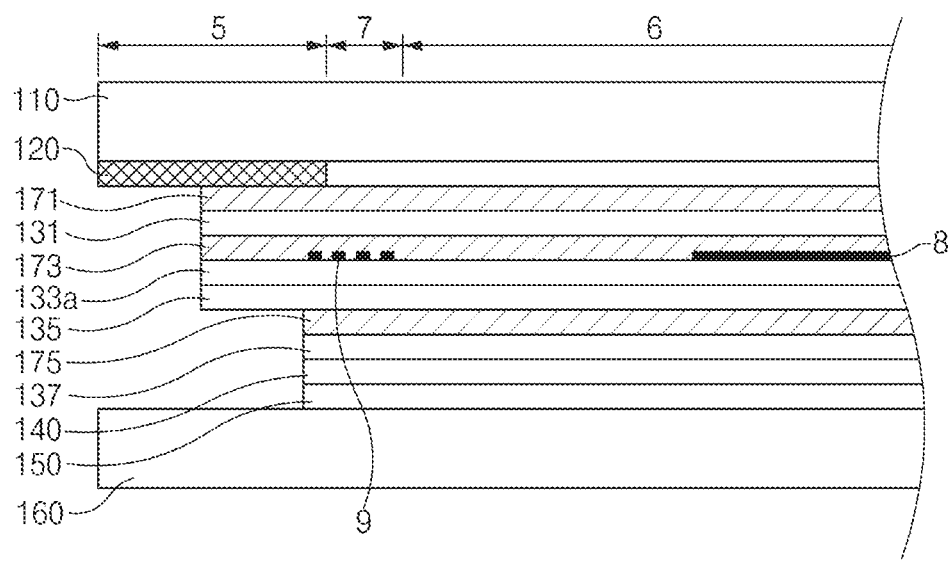
FIG. 5 illustrates an arrangement structure of electrode trace patterns according to an embodiment.

With reference to FIGS. 4 and 5, a front surface (e.g., cover glass 110) of the electronic device 100 may include a view region 4 and a blind region 5 formed by the printed member 120. The view region 4 may be a region that transmits light from the display panel 137 to provide any screen. In one embodiment, the view region 4 may include an active region 6 in which data based on driving of the display panel 137 is displayed and a black matrix region 7. The blind region 5 may be a region in which the internal space of the electronic device 100 is shielded by the opaque material contained in the printed member 120.

In one embodiment, the touch panel 133a may be disposed in a region between the first polarizing plate 131 and the second polarizing plate 135. According to this configuration, a restriction on a formation position of an electrode pattern 8 and/or an electrode trace pattern 9 formed on at least some regions of the touch panel 133a may be relaxed. For example, as the electrode trace pattern 9 is shielded by the first polarizing plate 131 from the outside, the electrode trace pattern 9 may be inserted from under an opaque region of the printed member 120 into under a black matrix region 7. This may be resulted from a reduction of a bezel region of the electronic device 100.

Figure 6A:
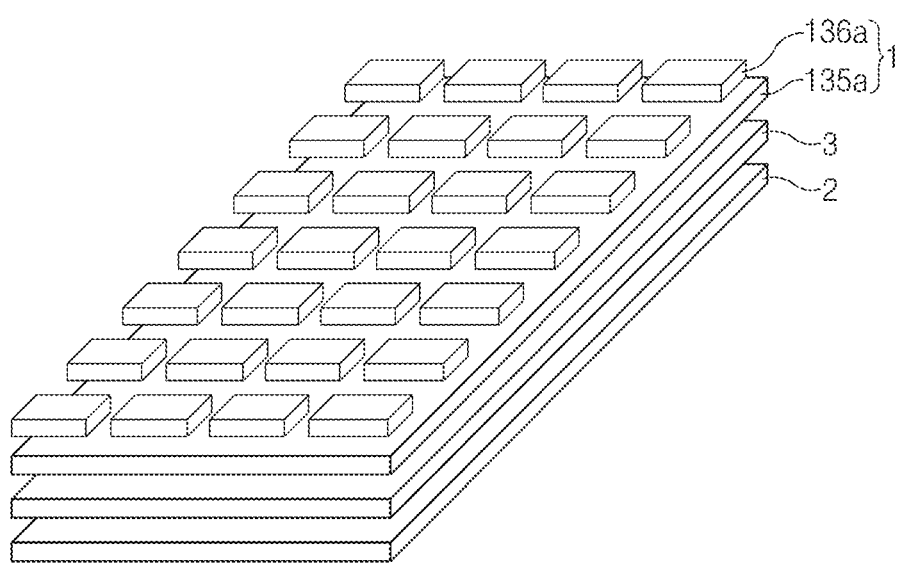
FIG. 6A illustrates a configuration of a touch panel according to an embodiment.
Figure 6B:
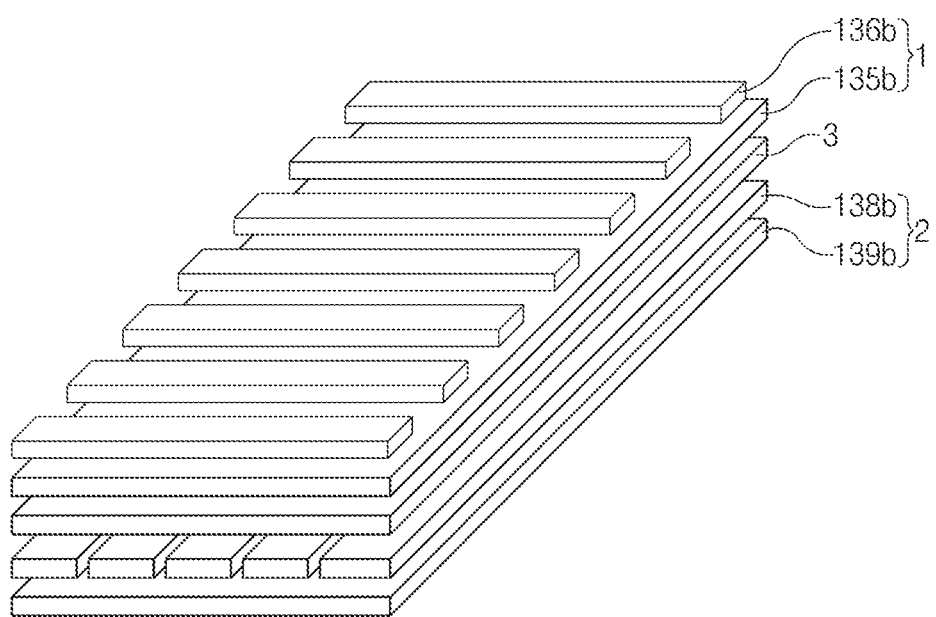
FIG. 6B illustrates a configuration of a touch panel according to another embodiment.

FIGS. 6A and 6B illustrate configurations of touch panels according to various embodiments. A touch panel described below may include the touch panel 133a of FIG. 2A or the touch panel 133b of FIG. 2B described above.

With reference to FIG. 6A, the touch panel 133a or 133b according to one embodiment may include a first electrode layer 1, a dielectric layer 3, and a second electrode layer 2.

In one embodiment, at least one of the first electrode layer 1 or the second electrode layer 2 (e.g., the first electrode layer 1) may include a printed circuit board 135a (or an insulating substrate) and an electrode pattern 136a formed on the printed circuit board 135a. Further, at least one of the first electrode layer 1 or the second electrode layer 2 (e.g., the second electrode layer 2) may include a metal material (e.g., copper, magnesium, silver, titanium, or the like), at least a portion of which has a conductivity.

In one embodiment, the electrode pattern 136a may be formed on at least one surface of a top surface or a bottom surface of the printed circuit board 135a, and may include an electrode array in which a plurality of electrodes are repeated regularly. The touch panel 133a or 133b may detect a change in physical quantity (e.g. capacitance) of each of the plurality of electrodes to calculate a position (or coordinate) at which the user input (e.g., touch, drag, sweep, press, gesture, proximity, hovering, or the like) is applied.

In various embodiments, the plurality of electrodes may include at least one of a transparent conductive film (e.g., indium tin oxide (ITO) or indium zinc oxide (IZO)), an Ag nanowire, a metal mesh, or a carbon allotrope (e.g., graphene).

In one embodiment, the dielectric layer 3 may be disposed between the first electrode layer 1 and the second electrode layer 2. In various embodiments, the dielectric layer 3 may include at least one material taking account of an inherent dielectric constant of the material. For example, the dielectric layer 3 may include at least one compound (e.g., silicon, polymer, rubber, sponge, urethane, or the like). Alternatively, the dielectric layer 3 may be implemented as an air layer.

With reference to FIG. 6B, the touch panel 133a or 133b according to another embodiment may include the first electrode layer 1, the dielectric layer 3, and the second electrode layer 2. The dielectric layer 3 may be identical or correspond to that described above with reference to FIG. 6A.

In one embodiment, the first electrode layer 1 may include a printed circuit board 135b (or an insulating substrate) and an electrode pattern 136b formed on the printed circuit board 135b. The electrode pattern 136b may include an electrode array in which a plurality of electrodes are elongated in a first direction. The second electrode layer 2 may include a printed circuit board 139b (or an insulating substrate) and an electrode pattern 138b formed on the printed circuit board 139b. The electrode pattern 138b may include an electrode array in which a plurality of electrodes are elongated in a second direction orthogonal to the first direction. The touch panel 133a or 133b may measure a change in a physical quantity (e.g., capacitance) occurring in an intersection region between the electrode array in the first direction and the electrode array in the second direction to calculate a position (or coordinate) at which the user input is occurred.

Figure 7:
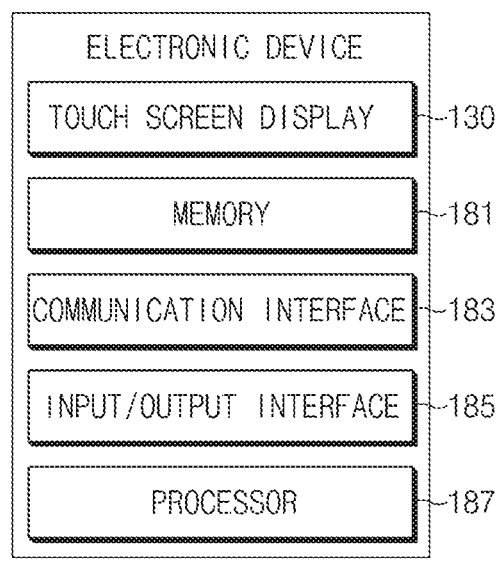
FIG. 7 is a view illustrating a configuration of an electronic device according to an embodiment.

FIG. 7 is a view illustrating a configuration of an electronic device according to an embodiment.

With reference to FIG. 7, the electronic device 100 may further include at least one component related to system resources. For example, the electronic device 100 may further include a memory 181, a communication interface 183, an input/output interface 185, or a processor 187, as well as the touch screen display 130 described above.

In one embodiment, the memory 181 may store at least one program associated with any screen output by the display panel (137 in FIG. 1). The program may include, for example, an application program, a kernel, a middleware, an application programming interface (API), or the like. In various embodiments, at least some of the kernel, middleware, or the API may be referred to as an operating system.

The kernel may control or manage components (e.g., the memory 181 or the processor 187) associated with executing an operation or function implemented in other programs (e.g., the application program, the middleware, or the API). The middleware may act as an intermediary for the application program or the API to communicate with the kernel to transmit or receive data. In addition, the middleware may prioritize at least one task request received from the application program, and perform scheduling, load balancing, and the like for the task request based on the priority. The API is an interface for the application program to control functions provided in the kernel or middleware. In addition, the API may include at least one interface function or instruction for, for example, file control, window control, image processing, character control, or the like.

In various embodiments, the memory 181 may include at least one of a volatile memory (e.g., a dynamic RAM (DRAM), a static RAM (SRAM), a synchronous dynamic RAM (SDRAM), or the like), a non-volatile memory (e.g., an one time programmable ROM (OTPROM), a programmable ROM (PROM), an erasable and programmable ROM (EPROM), an electrically erasable and programmable ROM (EEPROM), or the like), a mask ROM, a flash ROM, or a flash memory.

The communication interface 183 may establish communication between the electronic device 100 and an external device. For example, the communication interface 183 may be connected to a network via a wireless communication or a wired communication, thereby communicating with the external device.

In various embodiments, the wireless communication may include at least one of Long-Term Evolution (LTE), LTE-Advanced (LTE-A), a Code Division Multiple Access (CDMA), a Wideband CDMA (WCDMA), a Universal Mobile Telecommunications System (UMTS), a Wireless Broadband (WiBro), or Global System for Mobile Communications (GSM). Further, the wireless communication may also include short-range communication such as, for example, Wireless Fidelity (Wi-Fi), Bluetooth, Near Field Communication (NFC), magnetic stripe transmission (MST), or the like.

The input/output interface 185 may deliver command or data input from the user or another external device to at least some components of the electronic device 100. Alternatively, the input/output interface 185 may output command or data received from at least some components of the electronic device 100 to the user or the another external device.

The processor 187 may control at least one component of the electronic device 100. For example, the processor 187 may drive an operating system or an application program to control at least one hardware or software component electrically or functionally connected to the processor 187. Alternatively, the processor 187 may perform communication operation or data processing for the at least one component of the electronic device 100.

In various embodiments, the processor 187 may include at least one of a central processing unit (CPU), an application processor (AP), or a communication processor (CP).

A touch screen display according to various embodiments described above may include a first polarizing plate, a second polarizing plate disposed under the first polarizing plate, a touch panel disposed between the first polarizing plate and the second polarizing plate, a display panel disposed under the second polarizing plate, and a photosensitive adhesive member disposed between the first polarizing plate and the touch panel and/or between the second polarizing plate and the display panel.

According to various embodiments, the photosensitive adhesive member may become adhesive in response to irradiation of light onto at least one region of the photosensitive adhesive member.

According to various embodiments, the photosensitive adhesive member may be cured in a predetermined time period after being adhesive.

According to various embodiments, the photosensitive adhesive member may have a thickness in a range of 2.5 to 75.0 micrometers (μm).

An electronic device according to various embodiments described above may include a housing having at least one open region, and a touch screen display disposed in an internal space of the housing, wherein at least a portion of the touch screen display is exposed through the open region of the housing.

According to various embodiments, the touch screen display may include a first polarizing plate, a second polarizing plate disposed under the first polarizing plate, a touch panel disposed between the first polarizing plate and the second polarizing plate, a display panel disposed under the second polarizing plate, and a photosensitive adhesive member disposed between the first polarizing plate and the touch panel and/or between the second polarizing plate and the display panel.

According to various embodiments, the photosensitive adhesive member may have a thickness in a range of 2.5 to 75.0 micrometers (μm).

According to various embodiments, the touch screen display may further include a cover glass disposed above the first polarizing plate to close the open region of the housing.

According to various embodiments, the photosensitive adhesive member may further be disposed between the cover glass and the first polarizing plate.

According to various embodiments, the display panel may include a liquid crystal display (LCD).

According to various embodiments, the first polarizing plate may include a first linear-polarizing plate in a first axis direction.

According to various embodiments, the second polarizing plate may include a second linear-polarizing plate in a second axis direction perpendicular to the first axis direction.

According to various embodiments, the display panel may include at least one of a light-emitting diode (LED) display or an organic light-emitting diode (OLED) display.

According to various embodiments, the first polarizing plate may include a first linear-polarizing plate in a first axial direction.

According to various embodiments, the second polarizing plate may include a first phase-retardation polarizing plate.

According to various embodiments, the first phase-retardation polarizing plate may include at least one of a λ/4 or λ/2 phase-retardation polarizing plate.

According to various embodiments, the photosensitive adhesive member may shield at least a portion of at least one electrode layer included in the touch panel when disposed between the first polarizing plate and the touch panel.

According to various embodiments, the touch screen display may have flexibility of a predetermined level.

According to various embodiments, the touch panel may include a first electrode layer and a second electrode layer disposed under the first electrode layer.

According to various embodiments, at least one of the first electrode layer and the second electrode layer may include an electrode pattern, wherein a plurality of electrodes are regularly repeated in the electrode pattern.

According to various embodiments, one of the first electrode layer and the second electrode layer may include a first electrode pattern, wherein a plurality of electrodes are elongated in a first direction in the first electrode. In addition, the other of the first electrode layer and the second electrode layer may include a second electrode pattern, wherein a plurality of electrodes are elongated in a second direction perpendicular to the first direction in the second electrode pattern.

Figure 8:
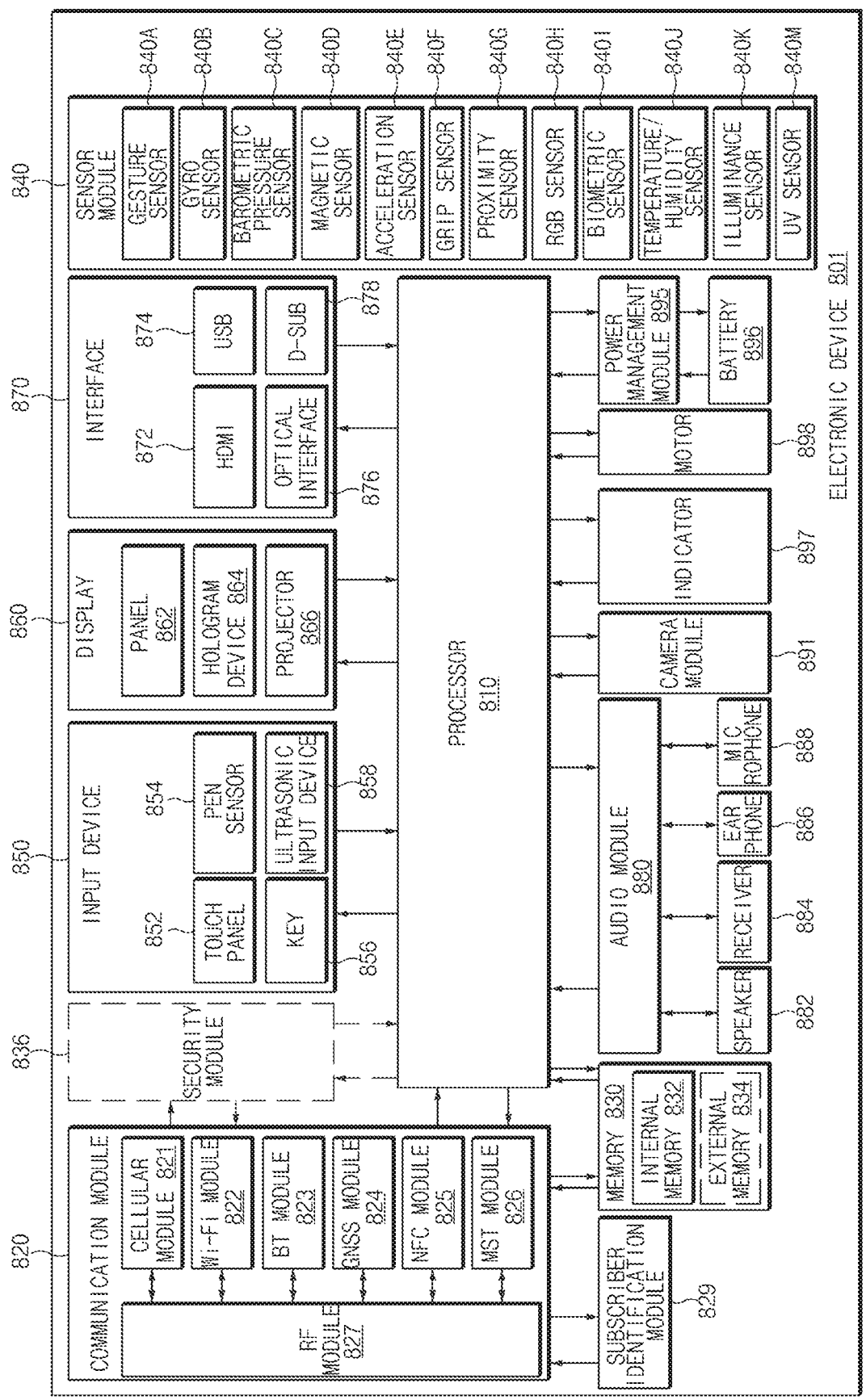
FIG. 8 is a block diagram of an electronic device according to an embodiment.

FIG. 8 is a block diagram of an electronic device according to an embodiment.

Referring to FIG. 8, an electronic device 801 may include, for example, all or a part of the electronic device 100 illustrated in FIG. 7. The electronic device 801 may include one or more processors (e.g., an application processor (AP)) 810, a communication module 820, a subscriber identification module 829, a memory 830, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application to control a plurality of hardware or software elements connected to the processor 810 and may process and compute a variety of data. For example, the processor 810 may be implemented with a System on Chip (SoC). According to an embodiment, the processor 810 may further include a graphic processing unit (GPU) and/or an image signal processor. The processor 810 may include at least a part (e.g., a cellular module 821) of elements illustrated in FIG. 8. The processor 810 may load an instruction or data, which is received from at least one of other elements (e.g., a nonvolatile memory), into a volatile memory and process the loaded instruction or data. The processor 810 may store a variety of data in the nonvolatile memory.

The communication module 820 may be configured the same as or similar to the communication interface 183 of FIG. 7. The communication module 820 may include the cellular module 821, a Wi-Fi module 822, a Bluetooth (BT) module 823, a GNSS module 824 (e.g., a GPS module, a Glonass module, a Beidou module, or a Galileo module), a near field communication (NFC) module 825, a MST module 826 and a radio frequency (RF) module 827.

The cellular module 821 may provide, for example, voice communication, video communication, a character service, an Internet service, or the like over a communication network. According to an embodiment, the cellular module 821 may perform discrimination and authentication of the electronic device 801 within a communication network by using the subscriber identification module (e.g., a SIM card) 829. According to an embodiment, the cellular module 821 may perform at least a portion of functions that the processor 810 provides. According to an embodiment, the cellular module 821 may include a communication processor (CP).

Each of the Wi-Fi module 822, the BT module 823, the GNSS module 824, the NFC module 825, or the MST module 826 may include a processor for processing data exchanged through a corresponding module, for example. According to an embodiment, at least a part (e.g., two or more) of the cellular module 821, the Wi-Fi module 822, the BT module 823, the GNSS module 824, the NFC module 825, or the MST module 826 may be included within one Integrated Circuit (IC) or an IC package.

For example, the RF module 827 may transmit and receive a communication signal (e.g., an RF signal). For example, the RF module 827 may include a transceiver, a power amplifier module (PAM), a frequency filter, a low noise amplifier (LNA), an antenna, or the like. According to another embodiment, at least one of the cellular module 821, the Wi-Fi module 822, the BT module 823, the GNSS module 824, the NFC module 825, or the MST module 826 may transmit and receive an RF signal through a separate RF module.

The subscriber identification module 829 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 830 (e.g., the memory 181 of FIG. 7) may include an internal memory 832 or an external memory 834. For example, the internal memory 832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 834 may be operatively and/or physically connected to the electronic device 801 through various interfaces.

A security module 836 may be a module that includes a storage space of which a security level is higher than that of the memory 830 and may be a circuit that guarantees safe data storage and a protected execution environment. The security module 836 may be implemented with a separate circuit and may include a separate processor. For example, the security module 836 may be in a smart chip or a secure digital (SD) card, which is removable, or may include an embedded secure element (eSE) embedded in a fixed chip of the electronic device 801. Furthermore, the security module 836 may operate based on an operating system (OS) that is different from the OS of the electronic device 801. For example, the security module 836 may operate based on java card open platform (JCOP) OS.

The sensor module 840 may measure, for example, a physical quantity or may detect an operation state of the electronic device 801. The sensor module 840 may convert the measured or detected information to an electric signal. For example, the sensor module 840 may include at least one of a gesture sensor 840A, a gyro sensor 840B, a barometric pressure sensor 840C, a magnetic sensor 840D, an acceleration sensor 840E, a grip sensor 840F, the proximity sensor 840G, a color sensor 840H (e.g., red, green, blue (RGB) sensor), a biometric sensor 840I, a temperature/humidity sensor 840J, an illuminance sensor 840K, or an UV sensor 840M. Although not illustrated, additionally or generally, the sensor module 840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor that is a part of the processor 810 or independent of the processor 810 and is configured to control the sensor module 840. The processor may control the sensor module 840 while the processor 810 remains at a sleep state.

The input device 850 may include, for example, a touch panel 852, a (digital) pen sensor 854, a key 856, or an ultrasonic input unit 858. For example, the touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a part of a touch panel or may include an additional sheet for recognition. The key 856 may include, for example, a physical button, an optical key, or a keypad. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 130 of FIG. 7) may include a panel 862, a hologram device 864, or a projector 866. The panel 862 may be the same as or similar to the display panel 137 illustrated in FIG. 1. The panel 862 may be implemented, for example, to be flexible, transparent or wearable. The panel 862 and the touch panel 852 may be integrated into a single module. According to an embodiment, the panel 862 may include a pressure sensor (or force sensor) that measures the intensity of touch pressure by a user. The pressure sensor may be implemented integrally with the touch panel 852, or may be implemented as at least one sensor separately from the touch panel 852. The hologram device 864 may display a stereoscopic image in a space using a light interference phenomenon. The projector 866 may project light onto a screen so as to display an image. For example, the screen may be arranged in the inside or the outside of the electronic device 801. According to an embodiment, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-sub-miniature (D-sub) 878. Additionally or generally, the interface 870 may include, for example, a mobile high definition link (MHL) interface, a SD card/multi-media card (MMC) interface, or an infrared data association (IrDA) standard interface.

The audio module 880 may convert a sound and an electric signal in dual directions. The audio module 880 may process, for example, sound information that is input or output through a speaker 882, a receiver 884, an earphone 886, or the microphone 888.

For example, the camera module 891 may shoot a still image or a video. According to an embodiment, the camera module 891 may include at least one or more image sensors (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC), a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate the following effects: vibration, haptic, and the like. Although not illustrated, a processing device (e.g., a GPU) for supporting a mobile TV may be included in the electronic device 801. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 9:
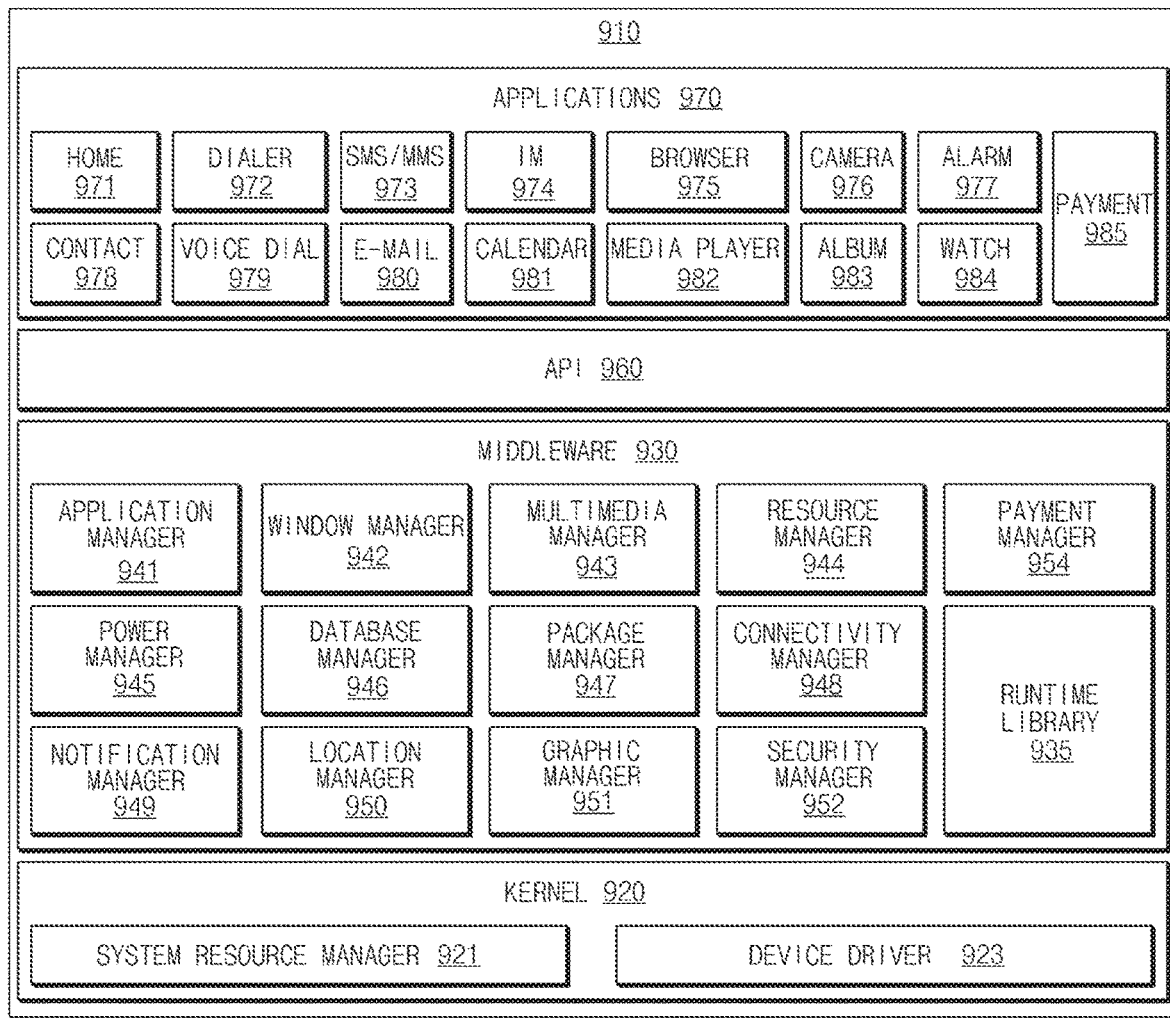
FIG. 9 is a block diagram of a program module according to an embodiment.

FIG. 9 is a block diagram of a program module according to an embodiment.

According to an embodiment, a program module 910 may include an operating system (OS) to control resources associated with an electronic device (e.g., the electronic device 100 of FIG. 7), and/or diverse applications driven on the OS. The OS may be, for example, Android, iOS, Windows, Symbian, or Tizen.

The program module 910 may include a kernel 920, a middleware 930, an application programming interface (API) 960, and/or an application 970. At least a portion of the program module 910 may be preloaded on an electronic device or may be downloadable from an external electronic device.

The kernel 920 may include, for example, a system resource manager 921 or a device driver 923. The system resource manager 921 may control, allocate, or retrieve system resources. According to an embodiment, the system resource manager 921 may include a process managing unit, a memory managing unit, a file system managing unit, or the like. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930 may provide, for example, a function that the application 970 needs in common, or may provide diverse functions to the application 970 through the API 960 to allow the application 970 to efficiently use limited system resources of the electronic device. According to an embodiment, the middleware 930 may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module that is used by a compiler to add a new function through a programming language while the application 970 is being executed. The runtime library 935 may perform input/output management, memory management, or capacities about arithmetic functions.

The application manager 941 may manage, for example, a life cycle of at least one application of the application 970. The window manager 942 may manage a graphic user interface (GUI) resource that is used in a screen. The multimedia manager 943 may identify a format necessary for playing diverse media files, and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage a battery or power, and may provide power information for an operation of an electronic device. The database manager 946 may generate, search for, or modify database that is to be used in at least one application of the application 970. The package manager 947 may install or update an application that is distributed in the form of package file.

The connectivity manager 948 may manage, for example, wireless connection such as Wi-Fi or Bluetooth. The notification manager 949 may display or notify an event such as arrival message, appointment, or proximity notification in a mode that does not disturb a user. The location manager 950 may manage location information about an electronic device. The graphic manager 951 may manage a graphic effect that is provided to a user, or manage a user interface relevant thereto. The security manager 952 may provide a general security function necessary for system security, user authentication, or the like. According to an embodiment, in the case where an electronic device (e.g., the electronic device 100 of FIG. 7) includes a telephony function, the middleware 930 may further include a telephony manager for managing a voice or video call function of the electronic device.

The middleware 930 may include a middleware module that combines diverse functions of the above-described elements. The middleware 930 may provide a module specialized to each OS kind to provide differentiated functions. Additionally, the middleware 930 may dynamically remove a part of the preexisting elements or may add new elements thereto.

The API 960 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 970 may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a watch 984, a payment 985, health care (e.g., measuring an exercise quantity, blood sugar, or the like) or offering of environment information (e.g., information of barometric pressure, humidity, temperature, or the like).

According to an embodiment, the application 970 may include an application (hereinafter referred to as "information exchanging application" for descriptive convenience) to support information exchange between an electronic device (e.g., the electronic device 100 of FIG. 7) and an external electronic device. The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 970 may include an application (e.g., a health care application of a mobile medical device) that is assigned in accordance with an attribute of an external electronic device. According to an embodiment, the application 970 may include an application that is received from an external electronic device. According to an embodiment, the application 970 may include a preloaded application or a third party application that is downloadable from a server. The names of elements of the program module 910 according to the embodiment may be modifiable depending on kinds of operating systems.

According to various embodiments, at least a portion of the program module 910 may be implemented by software, firmware, hardware, or a combination of two or more thereof. At least a portion of the program module 910 may be implemented (e.g., executed), for example, by the processor. At least a portion of the program module 910 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 187 of FIG. 7), may cause the one or more processors to perform a function corresponding to the instruction. The computer-readable storage media, for example, may be the memory (e.g., the memory 181 of FIG. 7).

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A touch screen display comprising:
   a first polarizing plate;
   a second polarizing plate disposed under the first polarizing plate;
   a touch panel disposed between the first polarizing plate and the second polarizing plate and being disposed directly on top of the second polarizing plate;
   a display panel disposed under the second polarizing plate; and
   a plurality of photosensitive adhesive members disposed between the first polarizing plate and the touch panel and between the second polarizing plate and the display panel,
   wherein a stacked structure is formed by the touch panel being adhered to the second polarizing plate and the first polarizing plate being stacked on a top surface of the touch panel using the plurality of photosensitive adhesive members, prior to the display panel being adhered to the stacked structure by a light irradiation and curing process.

2. The touch screen display of claim 1, wherein the photosensitive adhesive member becomes adhesive in response to the irradiation of the light onto at least one region of the photosensitive adhesive member.

3. The touch screen display of claim 2, wherein the photosensitive adhesive member is cured in a predetermined time period after being adhesive.

4. The touch screen display of claim 1, wherein the photosensitive adhesive member has a thickness in a range of 2.5 to 75.0 micrometers (μm).

5. An electronic device comprising:
   a housing having at least one open region; and
   a touch screen display disposed in an internal space of the housing, wherein at least a portion of the touch screen display is exposed through the open region of the housing,
   wherein the touch screen display includes:
   a first polarizing plate;
   a second polarizing plate disposed under the first polarizing plate;
   a touch panel disposed between the first polarizing plate and the second polarizing plate and being disposed directly on top of the second polarizing plate;
   a display panel disposed under the second polarizing plate; and
   a plurality of photosensitive adhesive members disposed between the first polarizing plate and the touch panel and between the second polarizing plate and the display panel,
   wherein a stacked structure is formed by the touch panel being adhered to the second polarizing plate and the first polarizing plate being stacked on a top surface of the touch panel using the plurality of photosensitive adhesive members, prior to the display panel being adhered to the stacked structure by a light irradiation and curing process.

6. The electronic device of claim 5, wherein the photosensitive adhesive member has a thickness in a range of 2.5 to 75.0 micrometers (μm).

7. The electronic device of claim 5, wherein the touch screen display further includes a cover glass disposed above the first polarizing plate to close the open region of the housing.

8. The electronic device of claim 7, wherein the photosensitive adhesive member is further disposed between the cover glass and the first polarizing plate.

9. The electronic device of claim 5, wherein the display panel includes a liquid crystal display (LCD),
   wherein the first polarizing plate includes a first linear-polarizing plate in a first axis direction, and
   wherein the second polarizing plate includes a second linear-polarizing plate in a second axis direction perpendicular to the first axis direction.

10. The electronic device of claim 5, wherein the display panel includes at least one of a light-emitting diode (LED) display or an organic light-emitting diode (OLED) display,
    wherein the first polarizing plate includes a first linear-polarizing plate in a first axial direction, and
    wherein the second polarizing plate includes a first phase-retardation polarizing plate.

11. The electronic device of claim 10, wherein the first phase-retardation polarizing plate includes at least one of a λ/4 or λ/2 phase-retardation polarizing plate.

12. The electronic device of claim 5, wherein the photosensitive adhesive member shields at least a portion of at least one electrode layer included in the touch panel when disposed between the first polarizing plate and the touch panel.

13. The electronic device of claim 5, wherein the touch screen display has flexibility of a predetermined level.

14. The electronic device of claim 5, wherein the touch panel includes a first electrode layer and a second electrode layer disposed under the first electrode layer, and wherein at least one of the first electrode layer and the second electrode layer includes an electrode pattern, wherein a plurality of electrodes are regularly repeated in the electrode pattern.

15. The electronic device of claim 5, wherein the touch panel includes a first electrode layer and a second electrode layer disposed under the first electrode layer, and wherein one of the first electrode layer and the second electrode layer includes a first electrode pattern, wherein a plurality of electrodes are elongated in a first direction in the first electrode, and wherein the other of the first electrode layer and the second electrode layer includes a second electrode pattern, wherein a plurality of electrodes are elongated in a second direction perpendicular to the first direction in the second electrode pattern.

\* \* \* \* \*